United States Patent
Grimaldi

(10) Patent No.: US 8,151,513 B2
(45) Date of Patent: Apr. 10, 2012

(54) TOP WATER FISHING LURE

(76) Inventor: Nicholas Louis Grimaldi, Katona, NY (US)

(*) Notice: Subject to any disclaimer, the term of this patent is extended or adjusted under 35 U.S.C. 154(b) by 1408 days.

(21) Appl. No.: 11/175,769

(22) Filed: Jul. 6, 2005

(65) Prior Publication Data

US 2007/0006517 A1    Jan. 11, 2007

(51) Int. Cl.
*A01K 85/12* (2006.01)
*A01K 85/18* (2006.01)

(52) U.S. Cl. .............. 43/42.17; 43/42.19; 43/42.36

(58) Field of Classification Search ............. 43/42.08, 43/42.15, 42.16, 42.18, 42.19, 42.2, 42.24, 43/42.26, 42.28, 42.3, 42.36
See application file for complete search history.

(56) References Cited

U.S. PATENT DOCUMENTS

| | | | | |
|---|---|---|---|---|
| 121,182 | A * | 11/1871 | Mann | 43/42.19 |
| 881,805 | A * | 3/1908 | Klein | 43/42.36 |
| 973,246 | A * | 10/1910 | Aagaard | 43/44.6 |
| 1,820,887 | A * | 8/1931 | Pflueger | 43/42.29 |
| 1,836,650 | A * | 12/1931 | Davenport | 43/42.29 |
| 1,893,390 | A * | 1/1933 | Benzick et al. | 43/42.17 |
| 2,214,668 | A * | 9/1940 | Erickson | 43/42.08 |
| 2,435,730 | A * | 2/1948 | Worden | 43/42.08 |
| 2,611,984 | A * | 9/1952 | Gautsche, Jr. | 43/42.11 |
| 2,940,204 | A * | 6/1960 | Mehnert | 43/42.09 |
| 3,555,717 | A * | 1/1971 | Gautsche, Jr. | 43/42.17 |
| 4,201,008 | A * | 5/1980 | Sparkman | 43/42.13 |
| 5,133,148 | A | 7/1992 | Lawson | |
| 5,327,671 | A * | 7/1994 | Rosek | 43/42.17 |
| 5,353,540 | A | 10/1994 | Ward | |
| 5,566,497 | A | 10/1996 | Oesterreich | |
| 5,875,582 | A | 3/1999 | Ratzlaff et al. | |
| 6,640,485 | B1 | 11/2003 | Dykema | |
| 2005/0044770 | A1* | 3/2005 | Linklater | 43/42.11 |

* cited by examiner

*Primary Examiner* — David Parsley
(74) *Attorney, Agent, or Firm* — Mitchell Bittman

(57) ABSTRACT

A fishing lure is provided comprising: an elongated longitudinally aligned main wire shaft having a front and a rear portion; a spinner revolveably supported on the front portion of the main wire shaft; a wire shaft extension extending from the main wire shaft between the front portion and the rear portion of the shaft at an acute angle pointed away from the spinner; a fishing line attachment loop for attachment of a fishing line at a front end of the main wire shaft; a rear hook attachment loop at a rear end of the main wire shaft with a rear hook attached thereto; a front hook attachment loop at a distal end of the wire shaft extension with a front hook attached thereto; and a creature bait secured to the rear portion of the main shaft by having the shaft extend through the creature bait.

11 Claims, 3 Drawing Sheets

TOP WATER FISHING LURE

FIELD OF THE INVENTION

The present invention relates generally to a fishing lure, and more particularly to a sound and splash producing lure which is attached to a fishing line and is adapted for use on the surface of the water.

BACKGROUND OF THE INVENTION

In the art of fishing lures, the advantages of fishing lures capable of attracting fish by the use of a rotating member which produces a splashing or vibrational effect has long been known. For example, U.S. Pat. No. 2,653,408 issued to Bradley discloses a fishing lure having a propeller member mounted for rotation about a longitudinal axis. U.S. Pat. No. 3,012,357 issued to Helin discloses a fishing lure having a rotary blade mounted on a forward most end of a fish lure body. U.S. Pat. No. 3,367,059 issued to Puls provides a jointed sectional fishing lure having propellers secured to a cylindrical periphery of a center sectional portion of the fishing lure. U.S. Pat. No. 4,201,008 issued to Sparkman discloses an improved spinner for use on a fishing lure having a blank made from a sheet of metal having lugs at opposite ends thereof bent at right angles and on opposite sides thereof, the lugs having hole there through for revolvably supporting the spinner on a supporting wire.

While these propellers and spinners are effective, it is an object of this invention to provide an improved top water fishing lure using a propeller/spinner and a creature bait to attract and catch fish.

SUMMARY OF THE INVENTION

A fishing lure is provided comprising: an elongated longitudinally aligned main wire shaft having a front and a rear portion; a spinner revolveably supported on the front portion of the main wire shaft; a wire shaft extension extending from the main wire shaft between the front portion and the rear portion of the shaft at an acute angle pointed away from the spinner; a fishing line attachment loop for attachment of a fishing line at a front end of the main wire shaft; a rear hook attachment loop at a rear end of the main wire shaft with a rear hook attached thereto; a front hook attachment loop at a distal end of the wire shaft extension with a front hook attached thereto; and a creature bait secured to the rear portion of the main shaft by having the shaft extend through the creature bait.

DETAILED DESCRIPTION OF THE INVENTION

The fishing lure of this invention is a top water fishing lure which is designed to create noise, splash and movement of a live natural creature to attract and catch fish while going above weeds and rocks, while not picking up weeds or getting snagged. It is designed to hook whatever attacks it, with either the rear treble hook or the front treble hook. It is designed to swim in a normal manner, create noise and is user friendly. To use the lure, it is cast out, holding the rod tip at an 11:00 o'clock position and reeled in. The lure will hold a rubber, silicon or plastic creature bait securely on the main shaft while casting and catching fish. The lure can be used over and over several times before the creature bait (e.g. a plastic hitchhiker) is worn or damaged. The creature bait then can easily be replaced with any plastic or silicon body to create a similar swim bait attractor by detaching the rear treble hook, removing the worn or damaged creature bait, sliding the replacement creature bait onto the main shaft and reattaching the rear treble hook.

Figure 1:
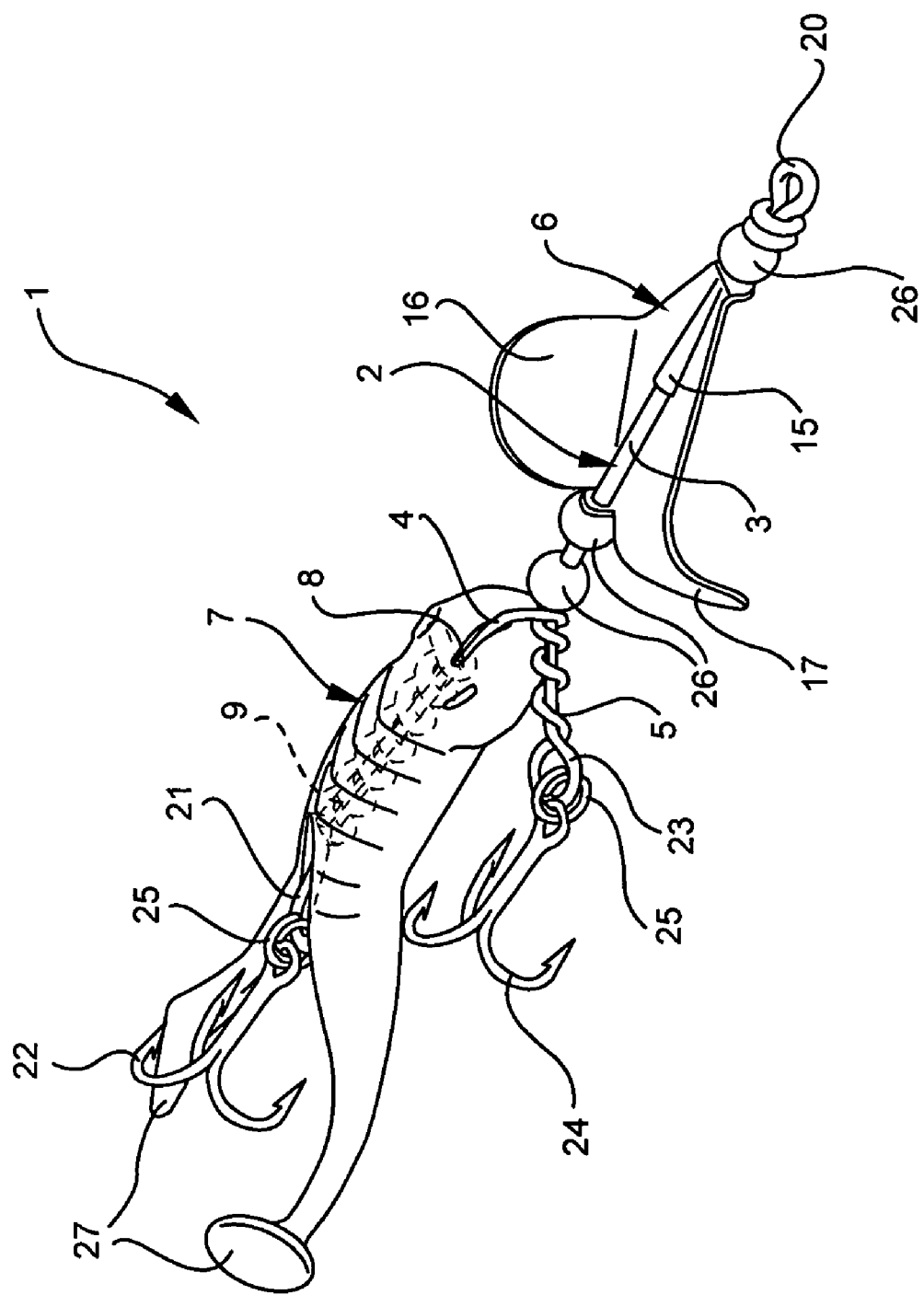
FIG. 1 is a side perspective view of the fishing lure.
Figure 2:
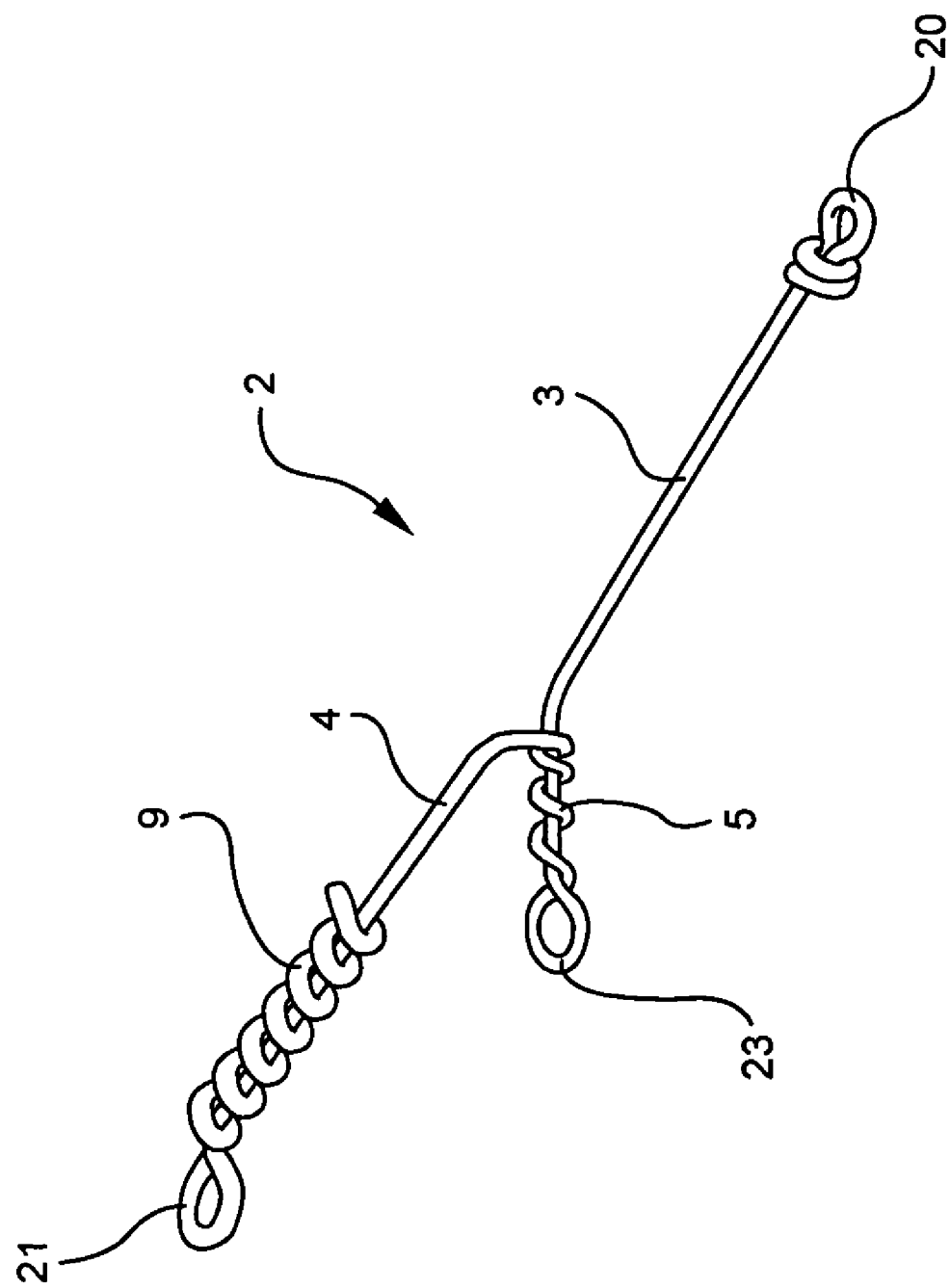
FIG. 2 is a side perspective view of the main wire shaft and wire shaft extension.

Referring to the FIGS. 1 and 2 the fishing lure 1 has an elongated and longitudinally aligned main wire shaft 2 having a front portion 3 and a rear portion 4. A wire shaft extension 5 extends from the main wire shaft 2 between the front portion 3 and the rear portion 4. Advantageously, the main wire shaft 2 and wire shaft extension 5 can be formed from a single continuous wire providing strength and ease of manufacture. The wire shaft extension 5 extends from the main wire shaft at an acute angle, generally about 30 to 60 degrees, preferably about 45 degrees, pointed away from the spinner 6. The wire shaft extension 5 provides balance, stability and a center of gravity for the fishing lure 1. During use of the fishing lure 1, the wire shaft extension 5 will be submerged in the water acting similar to the keel of a boat (a projection extending from the bottom of the boat) to provide stability.

Figure 3:
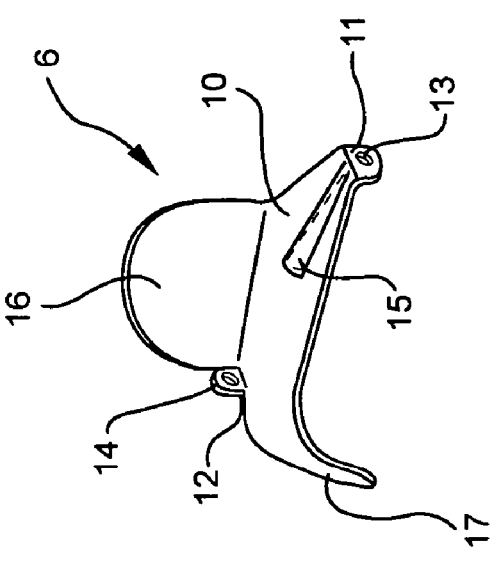
FIG. 3 is a side perspective view of the spinner.

The spinner 6 is a propeller that is revolvably supported on the front portion 3 of the main wire shaft 2. The spinner 6 rotates when pulled through the water on the fishing lure 1, creating noise, splashing and movement to attract the fish. A preferred spinner is that described in U.S. Pat. No. 4,201,008 to Sparkman, the disclosure of which is incorporated herein by reference. Referring to FIG. 3 the spinner 6 has a blank 10 made from a sheet of metal having a lug 11 at its forward end and a lug 12 at its rear end. The lugs 11 and 12 are bent in opposite directions and at substantially right angles to the plane of the blank 10. The lugs 11 and 12 have holes 13 and 14 respectively, therethrough for supporting the spinner 6 upon the front portion 3 of the main wire shaft 2. An opening 15 is provided in the blank 10 along the imaginary line extending between the holes 13 and 14 in the lugs 11 and 12. The blank 10 has conical protrusions extending outwardly from the plane of the blank 10. The spinner 6 also has blades 16 and 17, the blade 16 being bent in a direction opposite to that of the blade 17. The blades 16 and 17 are illustrated as being curved upwardly and downwardly at an angle oblique to the centerline of the spinner 6 and to approximately the same amount of curvature. It will be appreciated by those skilled in the art that the angle and amount of curvature may be varied, and that the angle and amount of curvature in the blades 16 and 17 may be the same or different. It will also be appreciated that the spinner 6 may have a variety of shapes and sizes and that although the spinner 6 is illustrated as being approximately triangular in shape, the spinner is not limited thereto.

Figure 4:
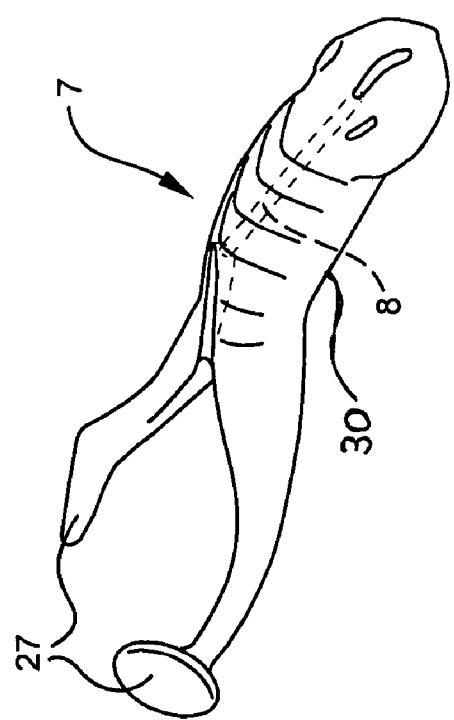
FIG. 4 is a side perspective view of the creature bait.

The main wire shaft 2 has a creature bait 7 secured to the rear portion 4. The creature bait is flexible and resilient and is in a shape that attracts fish, such as a frog, fish or lizard shape. The creature baits are common in the fishing lure industry and are generally made from a rubber, silicon or plastic material. As shown in FIG. 4 the creature bait has an axial bore 8 for inserting the rear portion 4 of the main wire shaft 2 therethrough to secure the creature bait 7 to the fishing lure 1. In a preferred embodiment, the rear portion 4 has a corrugated surface 9 for securing the bait to the shaft. The creature bait preferably has a substantially flat bottom surface 30 to aid the fishing lure in maintaining its buoyancy at the surface of the water during use.

The fishing lure 1 has a fishing line attachment loop 20 for attaching a fishing line at the front end of the main wire shaft 2. The fishing lure 1 also has a rear hook attachment loop 21 at the end of the rear portion 4 of the main wire shaft 2 with a rear hook 22 attached thereto, and a front hook attachment loop 23 at a distal end of the wire shat extension 5 with a front hook 24 attached thereto.

The preferred hooks 22 and 24 are treble hooks (e.g. size 4) as these increase the chances of catching any attracted fish.

The hooks are preferably attached to the loops by use of a split ring 25 which allows for the attachment and detachment of the hooks for replacement of the hooks or the creature bait.

Spacers 26 are used to separate the wire shaft extension 5 from the spinner 6 and to separate the fishing line attachment loop 20 from the spinner. This allows for free rotation by the spinner without interference from the fishing line attachment loop or the wire shaft extension and also helps to prevent weeds or debris from becoming attached to the lure and interfering with its operation.

While a typical fishing lure 1 used to catch bass is about 5 inches, measured from the fishing line attachment loop to the rear hook attachment loop, the size can vary considerably based on the fish. The fishing lure 1 can be readily constructed from a single continuous wire. A suitable wire is a 0.51 inch diameter steel wire. This allows the fishing lure to maintain its rigidity as well as provide for stability, strength and balance. The main wire shaft 2 and the wire shaft extension 5 can be formed from a single continuous wire, preferably the fishing line attachment loop 20, the rear hook attachment loop 21, the front hook attachment loop 23, the main wire shaft 2, the wire shaft extension 5 and the corrugated surface 9 are formed from a single continuous wire.

The fishing lure 1 can be formed by shaping the front end of the wire into a fishing line attachment loop 20; revolveably attaching the spinner 6 onto the front portion 3 of the main wire shaft 2; bending the wire at an angle after the front portion 3 of the main wire shaft 2 to form the wire shaft extension 5; forming a front hook attachment loop 23 the distal end of the wire shaft extension 5; shaping the wire to form the rear portion 4 of the main wire shaft 2, with the front portion 3 and the rear portion 4 of the main wire shaft 2 being elongated and longitudinally aligned; shaping the wire at the rear end of the main wire shaft 2 to form a rear hook attachment loop 21; forming the wire into the corrugated surface 9 on the rear portion 4 of the main wire shaft 2; securing the creature bait 7 to the rear portion 4 of the main wire shaft 2; and attaching the front hook 24 to the front hook attachment loop 23 and the rear hook 22 to the rear hook attachment loop 21.

The invention claimed is:

1. A fishing lure comprising:
   an elongated longitudinally aligned main wire shaft having a front portion and a rear portion;
   a spinner revolvably supported on the front portion of the main wire shaft;
   a wire shaft extension extending from the main wire shaft between the front portion and the rear portion of the main wire shaft at an angle of about 30 to 60 degrees pointed away from the spinner effective to provide balance, stability and a center of gravity for the fishing lure and wherein the main wire shaft and the wire shaft extension are formed from a single continuous wire effective to provide stability, strength and balance to the fishing lure;
   a fishing line attachment loop for attachment of a fishing line at a front end of the main wire shaft;
   a rear hook attachment loop at a rear end of the main wire shaft with a rear hook attached thereto;
   a front hook attachment loop at a distal end of the wire shaft extension with a front hook attached thereto; and
   a creature bait secured to the rear portion of the main wire shaft by having the main wire shaft extend through the creature bait.

2. Fishing lure of claim 1 wherein the spinner comprises a blank made from a sheet of metal having lugs at opposite ends thereof bent in parallel planes and at substantially right angles to the plane of said blank and on opposite sides thereof, said lugs having holes there through for revolvably supporting said spinner upon the front portion of the main wire shaft, a substantially circular opening through said blank spaced approximately equidistant from said lugs, a pair of conical protrusions extending outwardly from the plane of said blank, each of said protrusions having its base portion at said opening in the blank and its vertex adjacent to one of said lugs, each of said protrusions being on opposite sides of said blank from the lug adjacent thereto, and having laterally directed curved and oppositely bent impeller blades extending outwardly from an axis connecting said holes in the lugs.

3. Fishing lure of claim 2 having a spacer separating the wire shaft extension from the spinner.

4. Fishing lure of claim 3 having a spacer separating the fishing line attachment loop from the spinner.

5. Fishing lure of claim 4 wherein the front hook and the rear hook are treble hooks.

6. Fishing lure of claim 5 wherein a split ring is used to attach each of the hooks to the hook attachment loops.

7. Fishing lure of claim 6 wherein the rear portion of the main shaft has a corrugated surface to securely hold the creature bait.

8. Fishing lure of claim 7 wherein the creature bait is flexible and resilient and has a substantially flat underbelly facing towards the wire shaft extension.

9. Fishing lure of claim 7 wherein the fishing line attachment loop, the rear hook attachment loop, the front hook attachment loop, the main wire shaft, the wire shaft extension and the corrugated surface are formed from a single continuous wire.

10. Fishing lure of claim 9 wherein the fishing lure is formed by:
   shaping the front end of the wire into a fishing line attachment loop;
   rotatably attaching the spinner onto the front portion of the main wire shaft;
   bending the wire at an angle after the front portion of the main wire shaft to form the wire shaft extension;
   forming a front hook attachment loop at the distal end of the wire shaft extension;
   shaping the wire to form the rear portion of the main wire shaft, with the front portion and the rear portion of the main wire shaft being elongated and longitudinally aligned;
   shaping the wire at the rear end of the main wire shaft to form a rear hook attachment loop;
   forming the wire into the corrugated surface on the rear portion of the main wire shaft;
   securing the creature bait to the rear portion of the main wire shaft; and
   attaching the front hook to the front hook attachment loop and the rear hook to the rear hook attachment loop.

11. Fishing lure of claim 10 wherein a spacer is inserted onto the front portion of the main wire shaft between the fishing line attachment loop and the spinner and a spacer is inserted onto the front portion of the main wire shaft between the spinner and the wire shaft extension.

* * * * *